United States Patent
Myerly

Patent Number: 5,823,675
Date of Patent: Oct. 20, 1998

[54] STEPPED HELICAL SCRAPER BLADE FOR ICE CREAM MAKER

[75] Inventor: R. M. Scott Myerly, Hattiesburg, Miss.

[73] Assignee: Sunbeam Products, Inc., Delray Beach, Fla.

[21] Appl. No.: 845,349

[22] Filed: Apr. 25, 1997

[51] Int. Cl.⁶ ..................................... A23G 9/12
[52] U.S. Cl. ........................ 366/310; 366/320; 366/323
[58] Field of Search ................ 366/64, 66, 67, 366/97–99, 102–104, 186, 189, 194–196, 309, 310, 312, 313, 318, 319, 320, 323, 324, 342, 343; 62/68, 342, 343, 354, 381

[56] References Cited

U.S. PATENT DOCUMENTS

| | | | |
|---|---|---|---|
| 1,478,073 | 12/1923 | Van Kuren | 366/309 X |
| 2,289,613 | 7/1942 | Weinreich | 366/309 X |
| 2,746,730 | 5/1956 | Swenson et al. | 366/320 X |
| 2,758,823 | 8/1956 | Vasby | 366/318 |
| 2,810,557 | 10/1957 | Phelan | 366/320 X |
| 2,836,401 | 5/1958 | Phelan | 366/320 X |
| 2,847,197 | 8/1958 | Thompson, Jr. | 366/313 X |
| 3,061,281 | 10/1962 | Phelan et al. | 366/319 X |
| 3,170,676 | 2/1965 | Koch | 366/319 X |
| 3,298,190 | 1/1967 | Harker | 62/342 X |
| 3,641,783 | 2/1972 | Werner | 62/343 |
| 3,914,956 | 10/1975 | Knight, Jr. . | |
| 3,921,961 | 11/1975 | Hapgood . | |
| 4,201,558 | 5/1980 | Schwitters et al. . | |
| 4,364,666 | 12/1982 | Keyes . | |
| 4,488,817 | 12/1984 | Uesaka et al. . | |
| 4,551,026 | 11/1985 | Cristante . | |
| 4,551,159 | 11/1985 | Goldstein . | |
| 4,643,583 | 2/1987 | Cecchini . | |
| 4,732,013 | 3/1988 | Beck . | |
| 4,796,441 | 1/1989 | Goldstein . | |
| 4,799,364 | 1/1989 | Meier et al. . | |
| 4,885,917 | 12/1989 | Spector . | |
| 4,920,761 | 5/1990 | Bukoschek et al. . | |
| 4,956,980 | 9/1990 | Carvel . | |
| 4,969,166 | 11/1990 | Bukoschek et al. . | |
| 5,074,125 | 12/1991 | Schifferly | 366/312 X |
| 5,106,199 | 4/1992 | Eckel et al. . | |
| 5,312,184 | 5/1994 | Cocchi | 366/310 X |
| 5,549,042 | 8/1996 | Bukoschek et al. . | |

FOREIGN PATENT DOCUMENTS

| | | | |
|---|---|---|---|
| 497336 | 8/1992 | European Pat. Off. | 62/342 |

*Primary Examiner*—Charles E. Cooley
*Attorney, Agent, or Firm*—Dennis M. Carleton

[57] ABSTRACT

This invention discloses a mixing tool for an ice cream maker. The mixing tool is substantially helix-shaped and is disposed within the freezing chamber of an ice cream maker. The mixing tool serves a three-fold purpose. First, the mixing tool scrapes frozen ice cream mixture off of the walls of the freezing chamber. Second, the mixing tool is capable of whipping air into the ice cream mixture if the rate of rotation of the mixing tool is high. Third, the mixing tool urges frozen ice cream toward the dispensing valve of the freezing chamber.

6 Claims, 20 Drawing Sheets

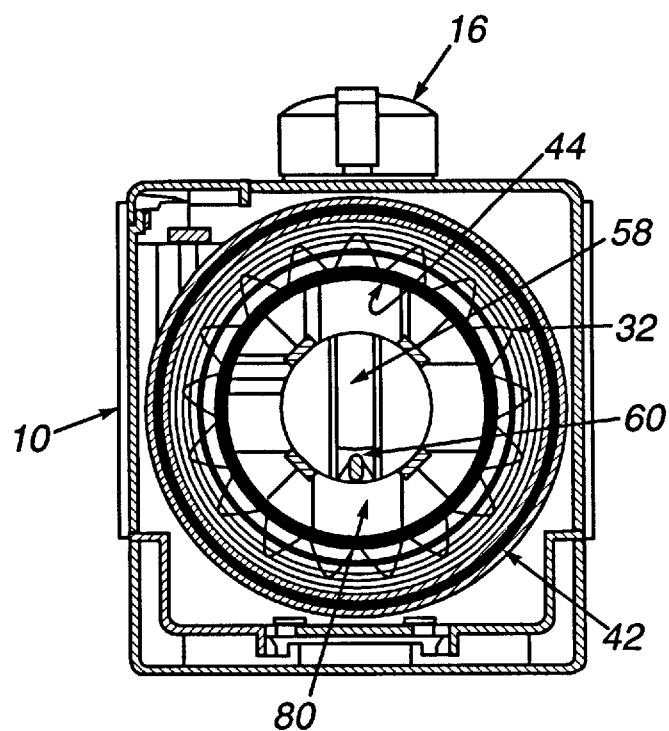
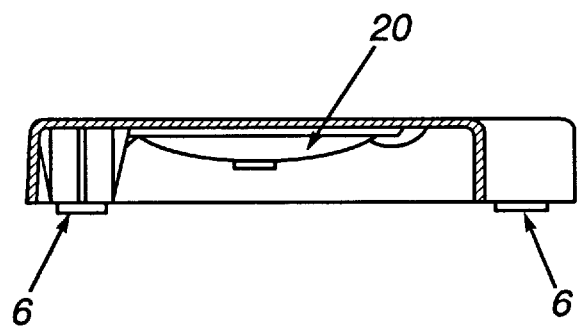
FIG. 5

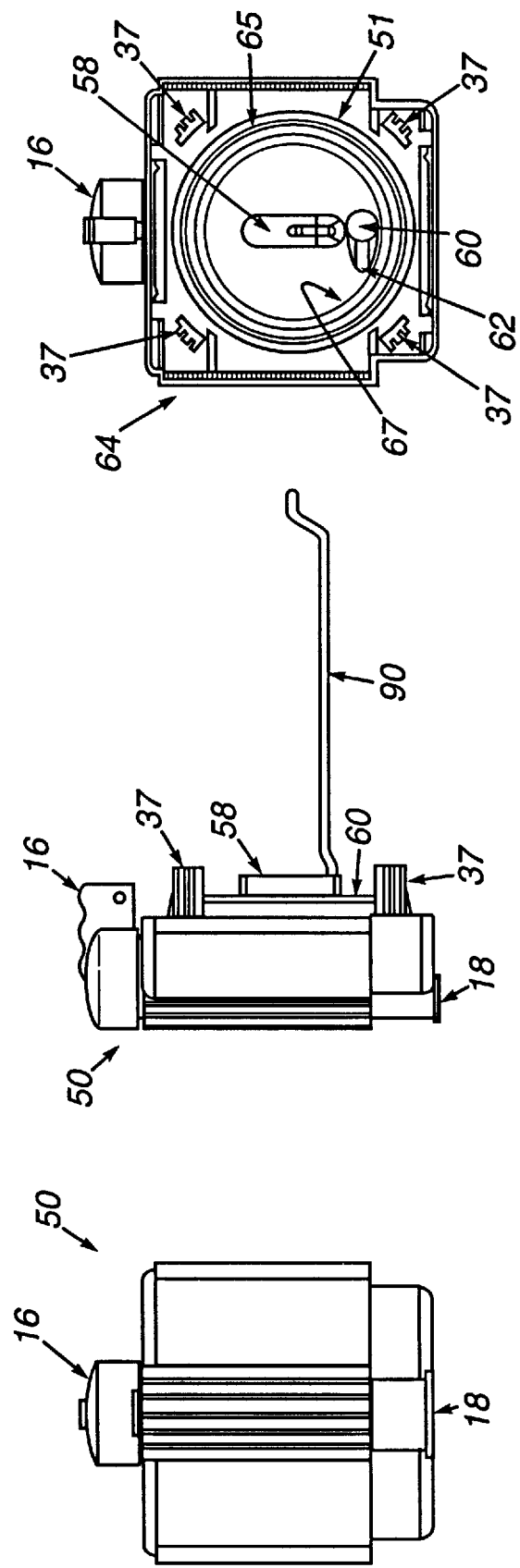

STEPPED HELICAL SCRAPER BLADE FOR ICE CREAM MAKER

BACKGROUND OF THE INVENTION

The making of ice cream in the home has been known for decades and has remained popular in spite of the plethora of ice cream, frozen yogurt and other frozen confections commonly available at any grocery store. As a result, many devices for the making of ice cream, frozen yogurt and other frozen confections in the home are well known in the art.

Such devices use a variety of methods to cool the ice cream mixture. One such method involves placing the mixture in a vessel which is surrounded by a eutectic solution of water, ice and salt. The vessels are typically constructed of a material known for its heat transfer capabilities, such as aluminum. It is also well known to use a vessel with hollow walls wherein a eutectic material is housed. Such a vessel is typically placed into a freezer until the eutectic material is frozen. The eutectic material is then melted using heat drawn through the walls of the vessel from the ice cream mixture, thereby bringing the mixture to the temperature necessary to freeze the mixture to the proper consistency. Such devices are shown in Cecchini (U.S. Pat. No. 4,643,583), Hapgood (U.S. Pat. No. 3,921,961) and Meyer et al. (U.S. Pat. No. 4,799,364).

It is also well known to use a device for scraping the frozen ice cream mixture from the sides of the freezing vessel. Many different designs of such devices, commonly referred to as "dashers, " are shown in the prior art. For example, Cecchini (U.S. Pat. No. 4,643,583), Beck (U.S. Pat. No. 4,732,013) and Eckel et al. (U.S. Pat. No. 5,106,199). Typically, the scraping of the frozen ice cream mixture is accomplished either by rotating the dasher within the freezing vessel or by rotating the freezing vessel around a stationery dasher.

One problem associated with the making of soft serve ice cream is achieving the proper consistency. This is most commonly achieved by aerating the ice cream mixture as it is frozen. Thus, one barrier to making soft serve ice cream in the home is the cost associated with the apparatus used to aerate the mixture. As a result, soft serve ice cream is typically only available outside the home environment where commercial soft serve ice cream makers are available. Such devices typically pump air into the freezing chamber in order to aerate the mixture, to achieve the proper consistency for soft serve ice cream. Such devices are shown in Giannella et al. (U.S. Pat. No. 4,412,428), Schwitters et al. (U.S. Pat. No. 4,201,558) and Keyes et al. (U.S. Pat. No. 3,898,866).

Another problem associated with soft serve ice cream is the dispensing thereof. Unlike hard ice cream, which is typically scooped from a container and placed on a cone or in a bowl, soft serve ice cream is usually drawn from a machine using an extrusion-like process whereby the soft serve ice cream is dispensed in a stream and piled up on a cone in a spiraled bee-hive shape. The cost of a machine capable of dispensing the ice cream in this manner is another reason why soft serve ice cream is usually only available outside the home in a commercial setting. Typically, in commercial machines which freeze ice cream mixtures into soft serve ice cream, the mixture is urged toward the extrusion orifice by the machine and is dispensed when a valve mechanism is opened. This can be seen in Manfroni (U.S. Pat. No. 4,711,376) and Schwitters (U.S. Pat. No. 4,203,461). Alternatively, many commercial units are merely dispensing machines which dispense pre-made soft serve ice cream by deforming a container thereof with a piston like device, as in Beach (U.S. Pat. No. 5,421,484), Montgomery et al. (U.S. Pat. No. 5,505,336) and Thomas (U.S. Pat. No. 5,405,054), or by urging the product toward the outlet with compressed air, as in Broussalian (U.S. Pat. No. 5,417,355).

SUMMARY OF THE INVENTION

It is therefore an object of this invention to provide a soft serve ice cream maker for domestic use that is capable of aerating the ice cream mixture to the proper consistency. It is a further object of this invention to provide an ice cream maker capable of dispensing the ice cream in the classic spiral beehive manner of commercial machines. Lastly, it is an object of this invention to provide these features in a low-cost, compact unit for at-home, table-top use.

Accordingly, the present invention provides an apparatus that meets these objectives. The preferred embodiment of the invention consists primarily of a vessel which serves as a freezing chamber, an auger-shaped dasher disposed therein, and a dispensing valve. The vessel, where the ice cream mixture is mixed and frozen, is cylindrically shaped, being closed on one end and open at the other. The auger-shaped dasher is disposed within the vessel and a dispensing valve assembly attaches to the open end of the vessel.

The vessel has an inner and an outer wall forming a sealed cavity therebetween which is filled with a eutectic fluid. In the preferred embodiment, the inner wall is constructed of aluminum. The closed end of the vessel contains a journaled bearing which extends from the interior of the vessel to the exterior of the vessel. The rotatable bearing engages the dasher on the inside of the vessel. The vessel is disposed in a horizontal position within a housing containing a motor. The motor engages the rotatable bearing on the exterior of the vessel in order to rotate the dasher within the vessel.

The dasher disposed within the vessel has three purposes. First, the dasher scrapes the ice cream mixture off the inner wall of the vessel as it freezes thereon. Second, the speed and shape of the device facilitates the whipping of air into the ice cream mixture, in order to produce the appropriate texture for soft serve ice cream. This is accomplished by rotating the dasher at a much higher rate than one would normally use for making hard ice cream (i.e., 100–130 rpm v. 45–50 rpm). Third, the dasher, aided by the horizontal orientation of the vessel, urges the frozen ice cream mixture toward the open end of the vessel where the dispensing valve is located.

The dispensing valve assembly serves to seal the open end of the vessel during operation, to allow the unfrozen ice cream mixture to be introduced into the vessel and to enable the convenient dispensing of ice cream directly into a dish or onto a cone when the freezing is complete.

The ice cream maker beeps after a suitable amount of time has elapsed, during which the ice cream mixture should have frozen into the proper consistency for soft serve ice cream, approximately thirty minutes. Thereafter, the ice cream maker beeps at two minute intervals to remind the user that the ice cream is done. Eventually, the motor of the device automatically turns off to avoid damage thereto by the load created by the frozen ice cream.

The housing of the unit has two alternative preferred embodiments. In one embodiment, the housing is supported above a table-top by a stand. The stand defines a drip tray underneath the dispensing orifice of the valve assembly to catch spills and drips that occur while dispensing the ice cream. In the alternative embodiment, the housing of the unit sits at the edge of a table top and a drip tray is suspended over the side of the table. In this embodiment, the drip tray folds up and slides underneath the housing for storage.

In operation, the vessel is first placed into a freezer to freeze the eutectic fluid between the inner and outer walls. The dasher is engaged with the rotating bearing located in the base of the vessel and the valve assembly is attached to the open end of the vessel. The vessel is placed in a horizontal orientation within the housing, with the portion of the rotatable bearing exterior to the vessel engaged with the motor. The ice cream mixture is then introduced into the vessel, and the unit is turned on, thereby rotating the dasher at approximately 120 rpm. Upon reaching the desired frozen consistency, the device beeps, and the ice cream may be dispensed via the valve assembly. Thereafter, the vessel may be removed from the housing by depressing a button which releases a spring-loaded detent mechanism that pushes the vessel and attached valve assembly out of the housing for cleaning, storage and refreezing of the eutectic fluid.

BRIEF DESCRIPTION OF THE DRAWINGS

FIG. 5 shows a cross-sectional view along line 5—5 of FIG. 4.

FIG. 14b shows a cross-sectional view of the bearing along line 14b—14b of FIG. 14a.

FIG. 17a shows a front elevational view of the valve assembly.

FIG. 17b shows a side elevational view of the valve assembly.

FIG. 17c shows a rear elevational view of the valve assembly.

DETAILED DESCRIPTION OF THE PREFERRED EMBODIMENT

The present invention is described with respect to the preferred physical embodiments constructed in accordance herewith. It will be apparent to those of ordinary skill in the art that various modifications and improvements may be made without departing from the scope and spirit of the invention. Accordingly, the invention is not limited by the specific embodiments illustrated and described, but only by the scope of the appended claims including all equivalents thereof.

In addition, although the preferred embodiment of this invention refers to a soft serve ice cream maker, it is recognized that the device can be made to work with any frozen food. Furthermore, certain aspects of this invention are applicable to other types of appliances which may not necessarily deal with the freezing of food or ice cream mixtures. Therefore, any and all references to "ice cream" or "ice cream mixture" is intended to include , inter alia, true ice cream, as well as ice milk, frozen yogurt, sorbet, other frozen confections and any type of mixture with which such an appliance as that disclosed herein would be used. Furthermore, as used herein, the term "soft serve" is intended to mean a frozen or partially or semi-frozen confection which is made flowable by air entrainment and/or agitation. Additionally, the term "dasher" is intended to mean any tool disposed within a vessel that performs a mixing, scraping, whipping, chopping or beating function.

Figure 1:
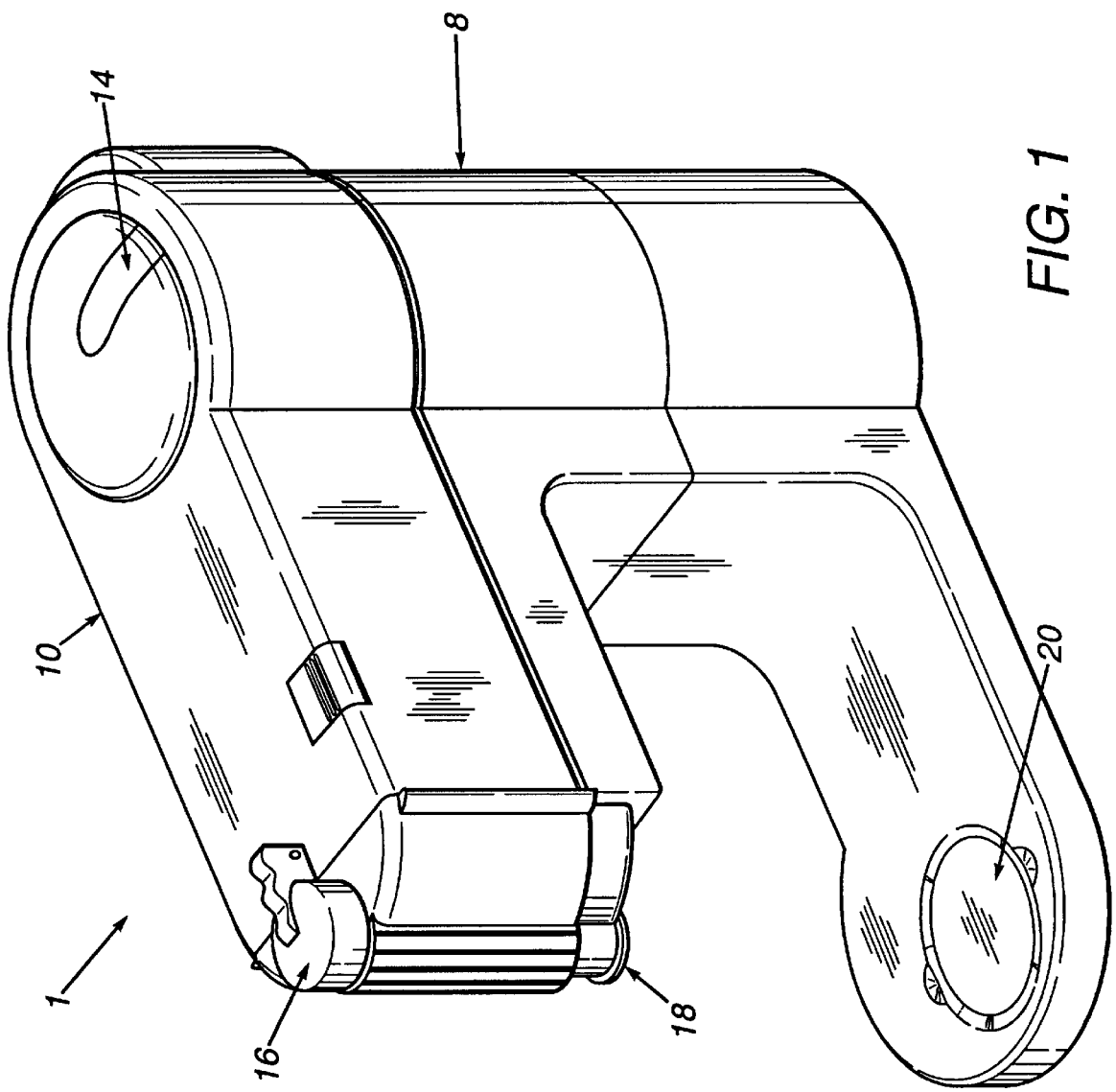
FIG. 1 shows the exterior of the device in perspective view.
Figure 2:
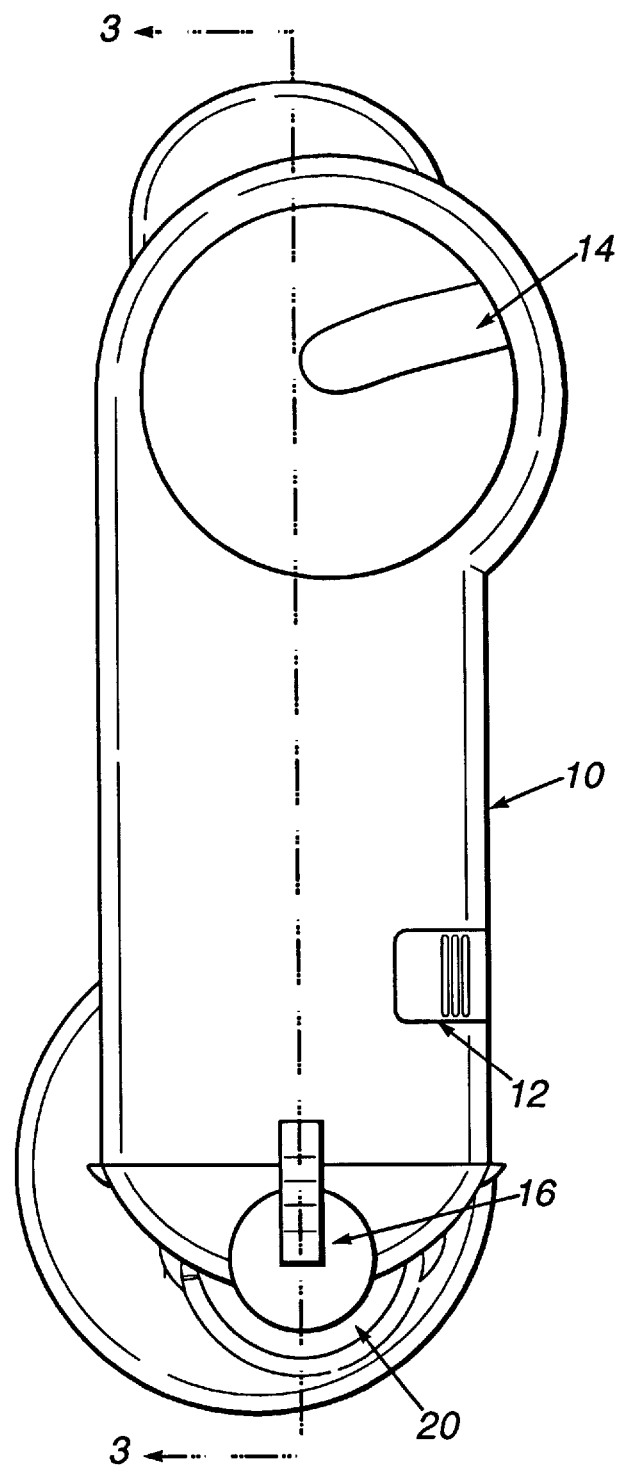
FIG. 2 shows a top plan view of the device.
Figure 6:
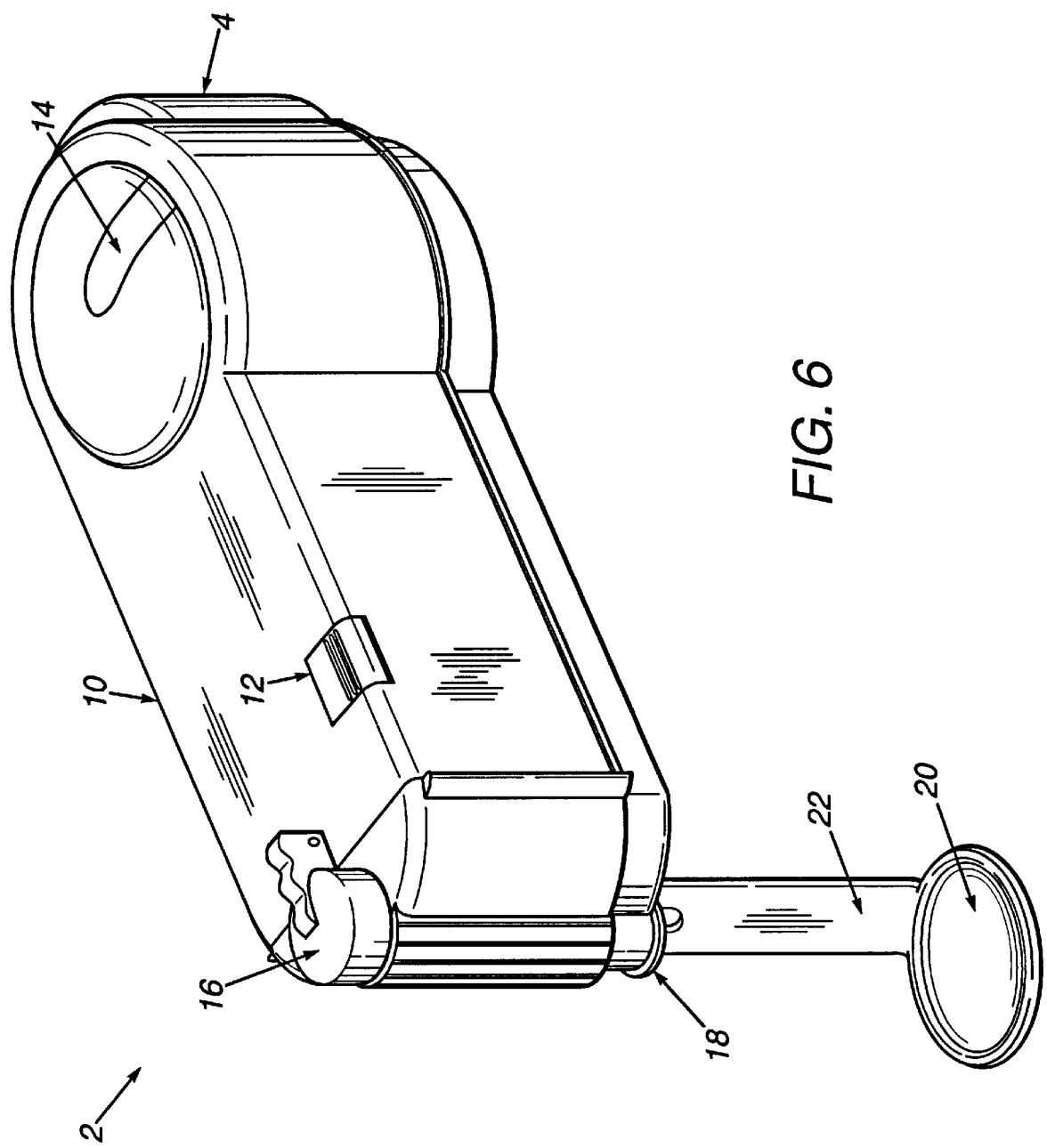
FIG. 6 shows a perspective view of an alternate embodiment of the exterior housing of the device.

Shown generally in FIGS. 1 and 6 are alternate embodiments of the device as a whole. FIG. 1 shows housing 10 mounted on stand 8. Stand 8 is equipped with an integral drip pan 20, which will catch drippings from dispensing orifice 18. FIG. 6 shows an alternate embodiment wherein housing 10 sits on a counter top near the edge thereof, and drip pan 20 hangs over the side of the counter top suspended by drip pan support 22. The embodiments of FIGS. 1 and 6 both use an identical housing 10 and may be configured as in either FIG. 1 or FIG. 6. Shown also in FIGS. 1 and 6 are on/off switch 12, release button 14, fill cap 16 and dispensing orifice 18, all of which will be described in greater detail below.

Figure 3:
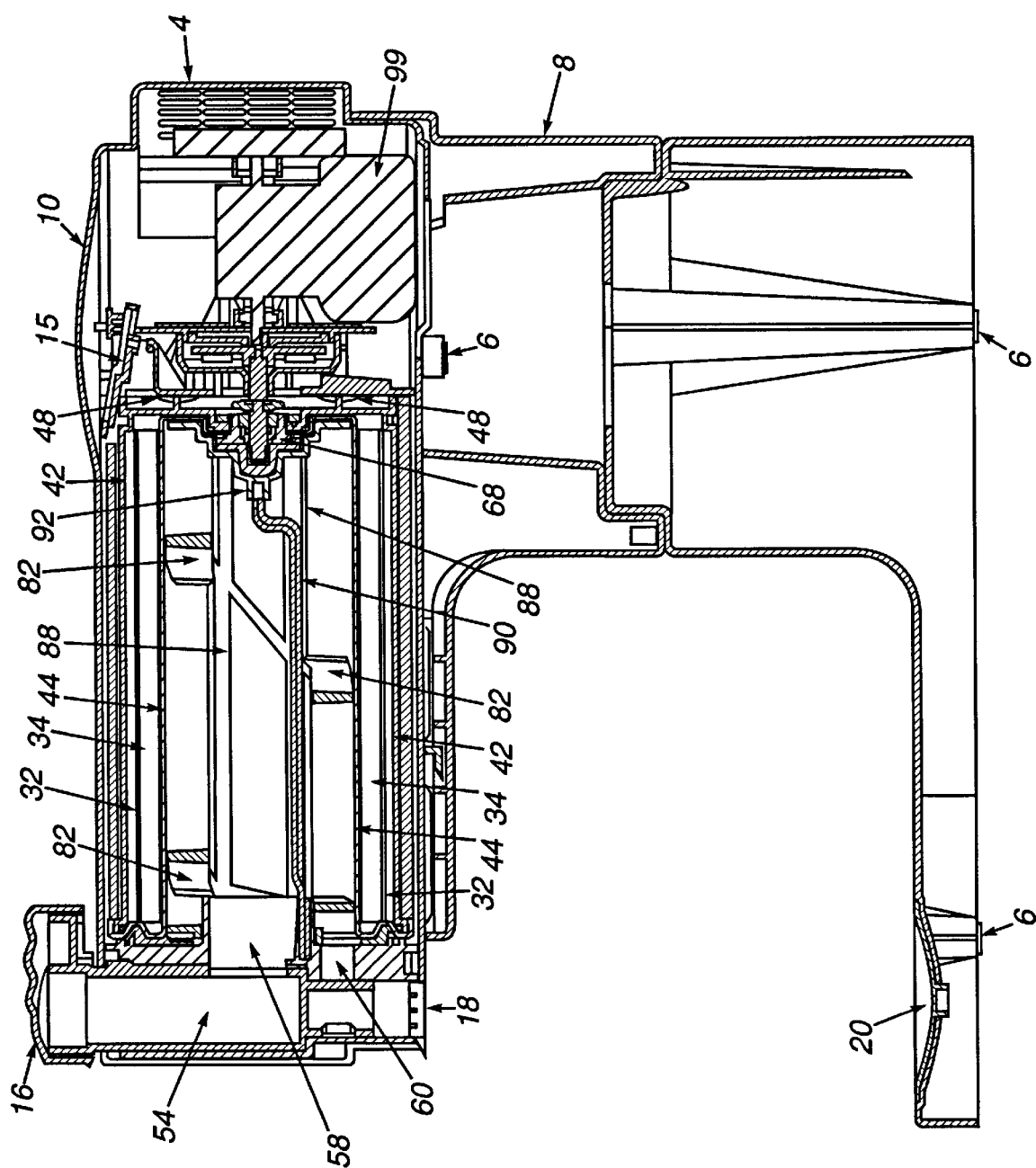
FIG. 3 shows a cross-sectional view of the device along line 3—3 of FIG. 2.
Figure 4:
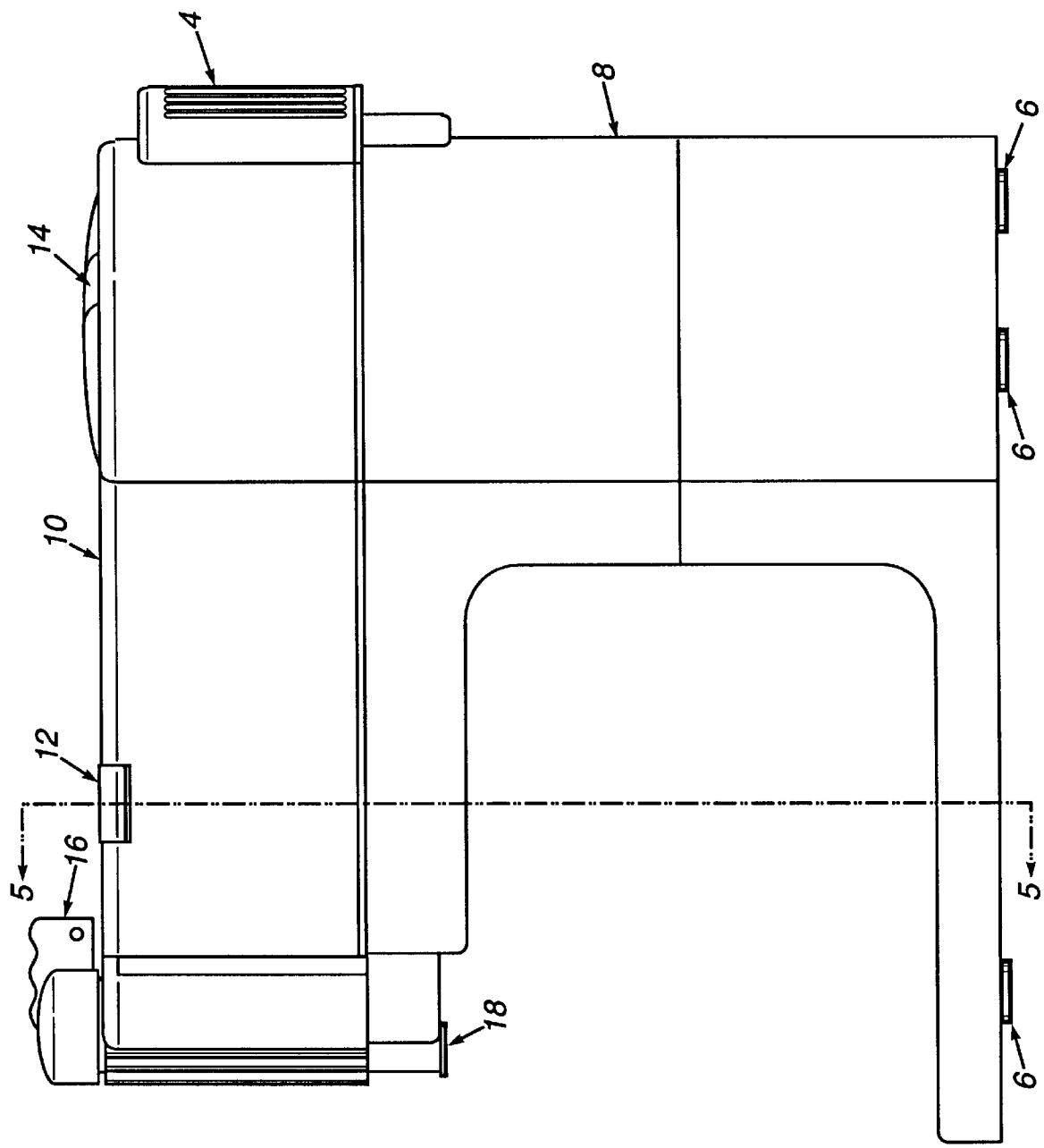
FIG. 4 shows a side elevational view of the device.
Figure 8:
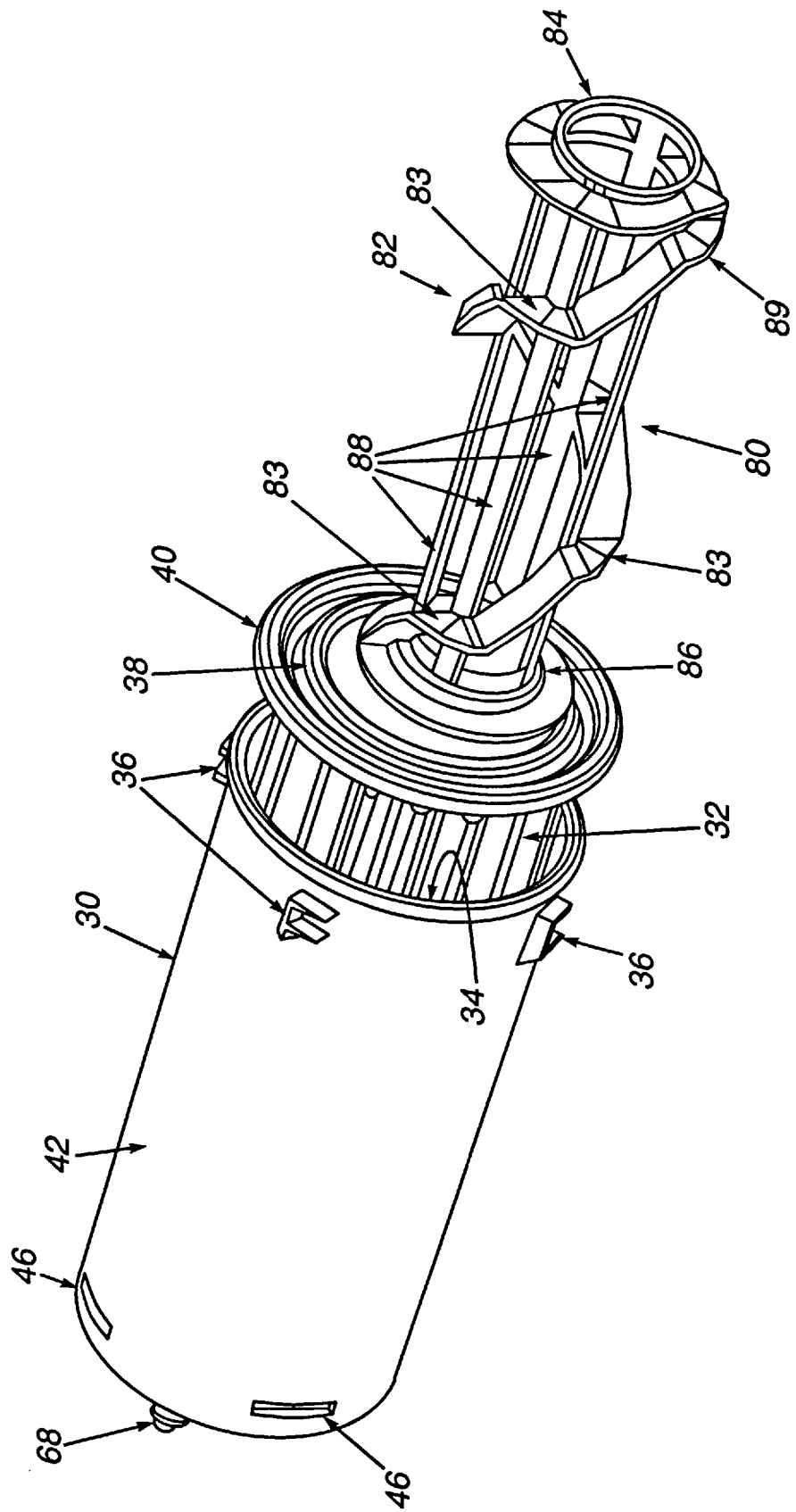
FIG. 8 shows an exploded view of the freezing vessel of the device.
Figure 9:
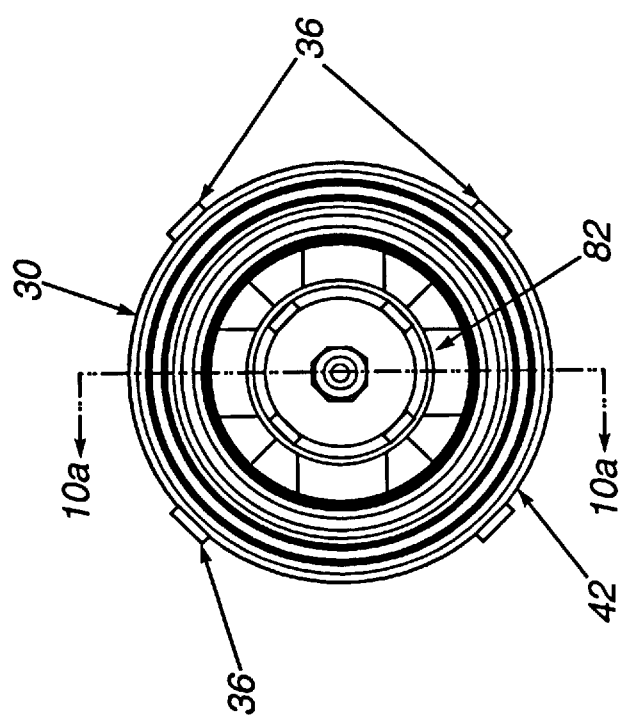
FIG. 9 shows a top view of the freezing vessel of the device.

The vessel 30, shown in FIG. 8, in which the mixture is frozen is horizontally disposed within housing 10. As best shown in FIG. 3, vessel 30 has outer wall 42 and inner wall 44 forming cavity 34 therebetween. Vessel top 40, shown in FIG. 8, is integral with inner wall 44 and forms a seal with outer wall 42. Inner wall 44, a heat exchange surface, and vessel top 44 are, in the preferred embodiment, integrally constructed of aluminum, but can be constructed of any heat conducting material and need not be integral with each other.

A eutectic solution is disposed within cavity 34 shown in FIG. 3. In operation, the eutectic fluid is frozen by placing vessel 30 into a freezer. The eutectic fluid only fills approximately eighty to ninety percent of cavity 34 to allow room within cavity 34 for expansion of the eutectic fluid as it freezes. The purpose of the eutectic fluid is to draw heat from inner wall 42, which in turn draws heat from the mixture disposed within vessel 30. The propagation of heat from the mixture to the eutectic fluid through inner wall 44 causes the frozen eutectic fluid to melt and the mixture to freeze. This process is aided by webbing 32 in FIG. 8 which is disposed within cavity 34. Webbing 32, in the preferred embodiment, consists of a piece of corrugated aluminum, but may be constructed from any heat conducting material. Webbing 32 contacts the outer surface of inner wall 44 shown in FIG. 10(a) and aids in the distribution of heat from inner wall 44 to the eutectic fluid. In the preferred embodiment, the eutectic fluid consists mainly of sodium polysaccharide, but may consist of any eutectic fluid well known by those skilled in the art.

Dasher 80, as best shown in FIG. 8 is disposed within vessel 30. Dasher 80 consists essentially of a substantially helix-shaped scraper blade 82 which is supported by a support structure consisting of upper and lower hubs 84 and 86 respectively, connected by a plurality of structural members 88. The purpose of dasher 80 is to scrape frozen mixture off of inner wall 44, to whip air into the mixture and to urge the frozen mixture towards the open end of vessel 30. It should be noted that no external source of air is present in the preferred embodiment. Dasher 80 whips the ambient air within vessel 30 into the mixture to aerate it. Although hubs 84 and 86 are circular in the preferred embodiment, it can be seen that they can be of any convenient shape. Additionally, in the preferred embodiment, four structural members 88 are used, but it can be seen that the number and shape of structural members 88 can vary. Although the main purpose of structural members 88 is to support blade 82, they also serve to aid in the aeration of the mixture as dasher 80 is rotated within vessel 30.

The pitch of helix-shaped scraper blade 82 changes at point 89 in FIG. 8. The purpose of the pitched helix-shape of scraper blade 82 is two-fold. First, the purpose of the portion of the helix with the greater pitch, below point 89, is to urge the semi-frozen product towards the open end of vessel 30. The purpose of the portion of the helix with a lesser pitch, above point 89, is to force the semi-frozen product out of vessel 30 through the outlet opening 60, shown in FIG. 17c.

In FIG. 8 the flat step areas 83 of blade 82, also have a two-fold purpose. First, steps 83 add to the turbulent flow of fluid within vessel 30, thereby aiding in the aeration of the mixture. Second, steps 83 allow dasher 80 to be molded from a single piece of plastic while keeping the cross sectional area of blade 82 constant. Without stepped areas 83, the cross sectional area of blade 82 would have to be increased at the points of intersection with structural members 88 to allow the dasher 80 to be removed from its mold. The increased cross-sectional areas required when blade 82 is molded without stepped areas 83 requires a longer cooling time after the injection of molten plastic into the mold before the molded piece can be removed therefrom, thereby resulting in an increased cost of manufacturing. Thus, the stepped areas 83 also serve to allow the dasher 80 to be molded as a single piece in an economically feasible manner.

Rod 90, as shown in FIGS. 3, 15, 17(b) and 18(b) and (c), is positioned within the center area of dasher 80, offset from the center of vessel 30. Rod 90 is stationary, being seated on one end in seat 92, shown in FIGS. 3 and 10(a) and (b), and held in place at the other end by valve assembly 50 best shown in FIG. 15 . Rod 90 serves to deflect frozen mixture from the center of vessel 30 to the area of vessel 30 which is swept by helical blade 82 as it rotates, such that the frozen mixture can be urged forward toward the outlet hole 60 by helical blade 82. Rod 90 also adds to the turbulent fluid flow within vessel 30, thus aiding in the aeration process.

In the preferred embodiment, dasher 80 is rotated within vessel 30 at an average speed of approximately 120 revolutions per minute, although this average speed can range from about 100 to about 130 revolutions per minute with the same results. Dasher 80 will rotate more slowly as the mixture within vessel 30 becomes thicker as it freezes.

Figure 10B:
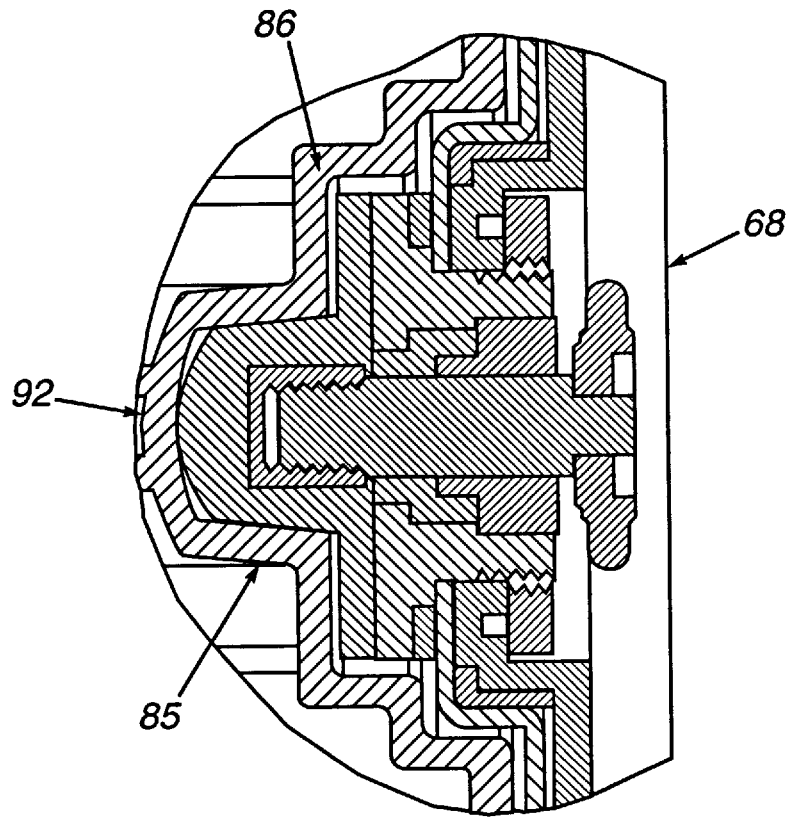
FIG. 10a shows a cross sectional view of the freezing vessel along line 10a—10a of FIG. 9, with an enlarged detail of the bearing of the device shown in FIG. 10b.
Figure 10A:
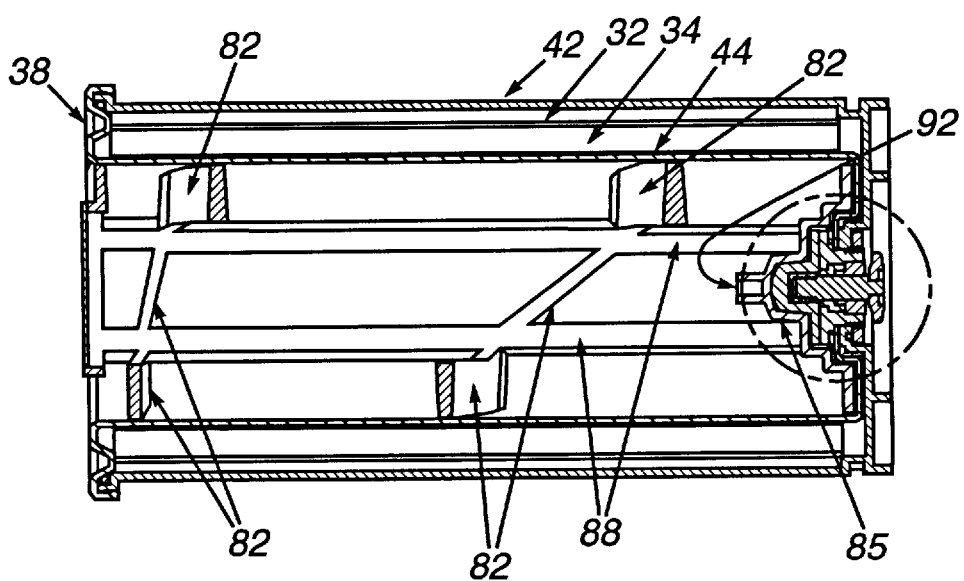
Figure 11:
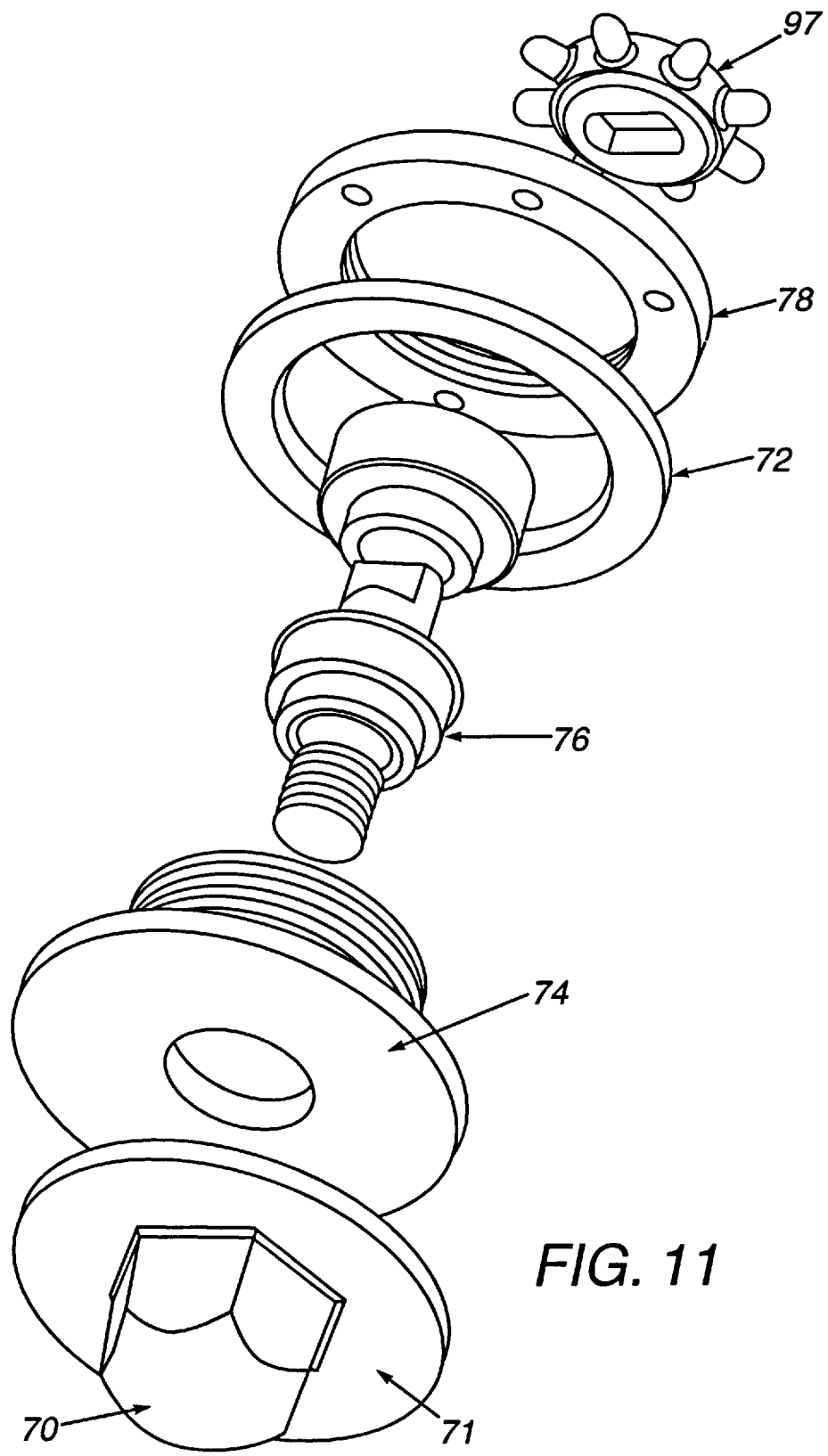
FIG. 11 shows an exploded view of the bearing of the device.
Figure 12:
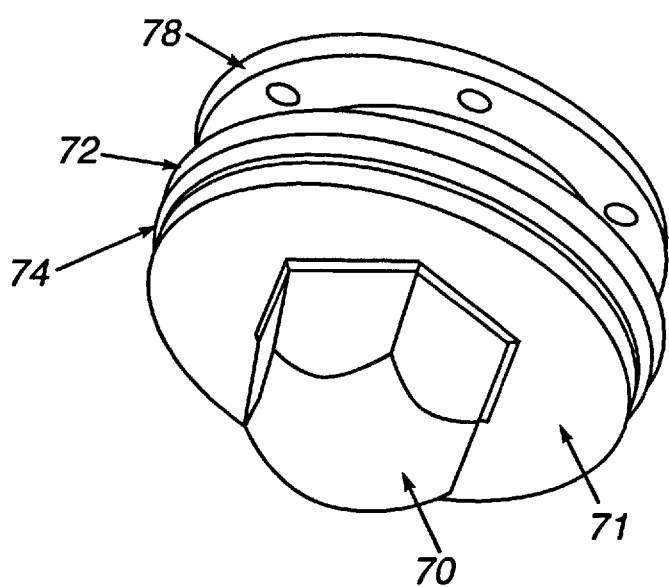
FIG. 12 shows the bearing of FIG. 11 assembled in perspective view.
Figure 13B:
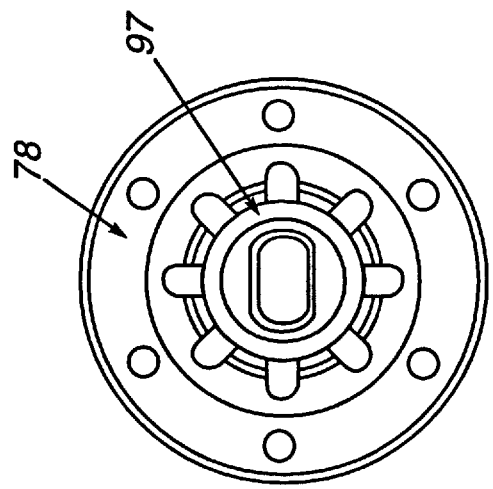
FIG. 13b shows a bottom view of the bearing of FIG. 11.
Figure 13A:
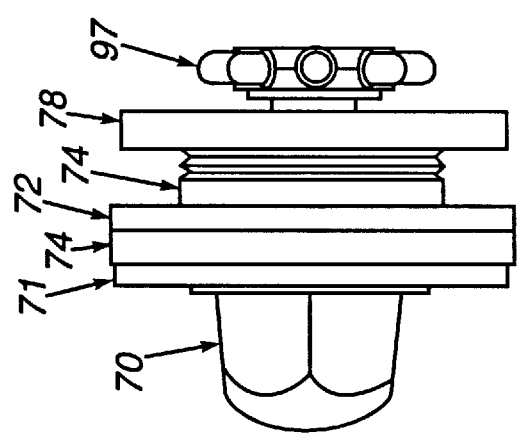
FIG. 13a shows a side elevational view of the bearing of FIG. 11.
Figure 14B:
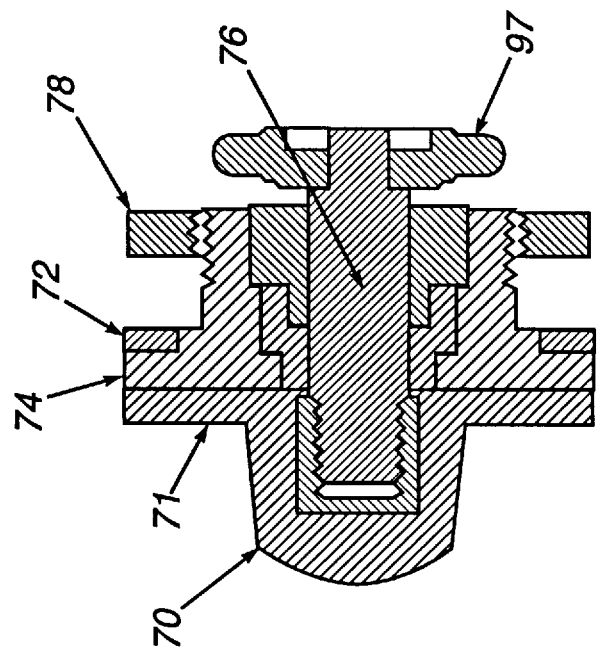
Figure 14A:
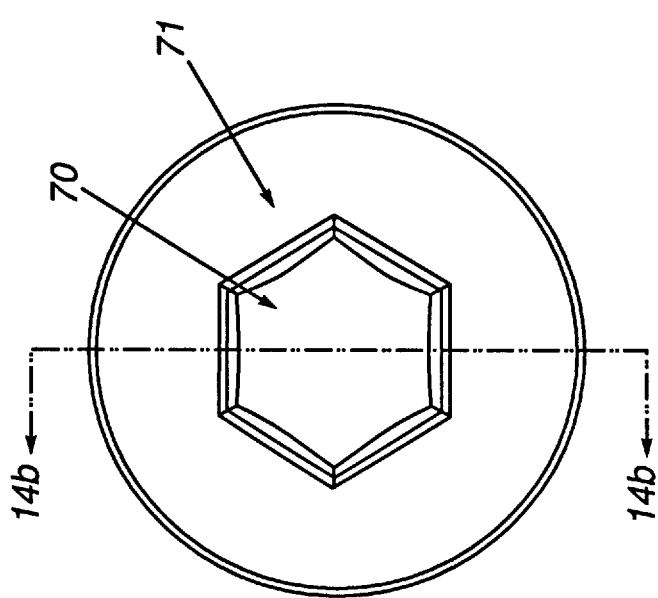
FIG. 14a shows a top view of the bearing of FIG. 11.

Dasher 80 is rotated by geared motor 99, as shown in FIG. 3, which is mounted within housing 10. Dasher 80 is coupled to motor 99 via journaled bearing 68, which extends through the base of vessel 30. As shown in FIGS. 11, 12, 13(a), 13(b), 14(a), and 14(b), bearing 68 consists of flange 74 and gasket 72, which are held in place on the interior of vessel 30 by retaining ring 78 which is positioned on the exterior of the base of vessel 30 and held in place by the threads of flange 74. Flange 74, gasket 72 and retaining ring 78 thereby form a fluid-tight seal. Spindle 76 extends through the hole in flange 74 and secures shoulder 71 in place. Shoulder 71 contains a polygonal, frustum-shaped boss 70 which extends therefrom. Boss 70 engages recess 85 shown in FIGS. 10(a) and (b) defined in the center of lower hub 86 of dasher 80, as shown in FIGS. 3 and 10, to rotate dasher 80 within vessel 30. Boss 70 and recess 85 may be of any shape which will allow boss 70 to rotate dasher 80. Spindle 80 engages ball gear 97 shown in FIGS. 13(a) and (b) on the exterior of vessel 30, which in turn engages a coupling collar with ribs (not shown) which is attached to geared motor 99, thereby allowing vessel 30 to be easily coupled to motor 99 as it is inserted into housing 10. In FIG. 3 air holes 4 in the rear of housing 10 serve to cool motor 99 as it rotates. On/off switch 12 is used to turn motor 99 on and off.

Figure 15:
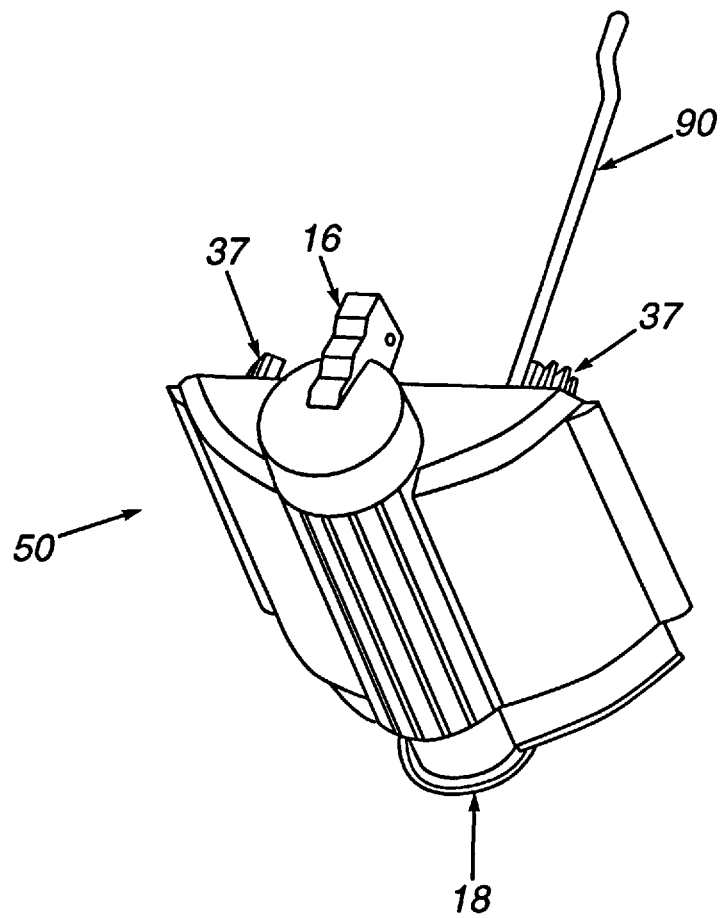
FIG. 15 shows the valve assembly in perspective view.
Figure 16:
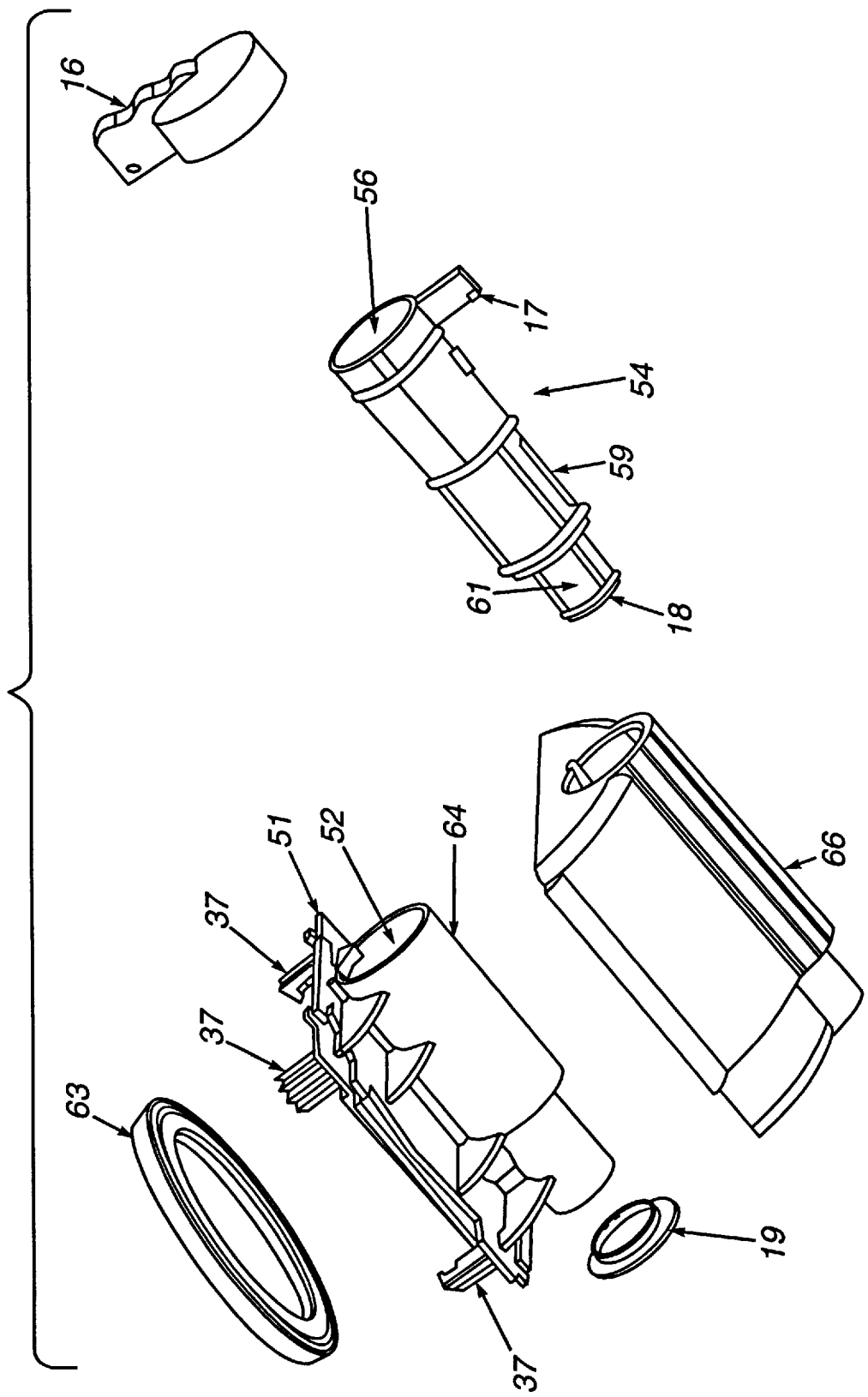
FIG. 16 shows the valve assembly in an exploded view.

Valve assembly 50 is shown in FIGS. 15 and 16. Valve assembly 50 is connected to and seals vessel 30 at the open end thereof. A plurality of hooks 37, best seen in FIG. 16, on the rear of valve assembly 50 engage a corresponding plurality of ribs 36 on the outer wall 42 of vessel 30, shown in FIG. 8, to hold valve assembly 50 in place.

In FIG. 16 molded gasket 63 fits in groove 38 of FIG. 8 of vessel top 40. Groove 38 and gasket 63 engage raised rib 65 defined on the rear of faceplate 51 of valve assembly 50, best shown in FIG. 17c, to make the seal between vessel 30 and valve assembly 50 fluid tight.

Guiding ring 67, also defined on the rear of faceplate 51 and shown in FIG. 17c, serves to keep dasher 80 in place as it rotates within vessel 30 by engaging upper hub 84 of dasher 80 when valve assembly 50 is in place.

Valve assembly 50 serves to allow a pourable mixture to be introduced into vessel 30 and also facilitates the dispensing of the semi-frozen product after the freezing process is complete. Valve assembly 50 consists of valve assembly housing 64, which includes faceplate 51, and integral shaft 52 attached thereto as shown in FIG. 16. Inlet opening 58 and outlet opening 60 extend through the wall of shaft 52 and the wall of faceplate 51, as shown in FIG. 17(c) and FIG. 3.

Figure 19C:
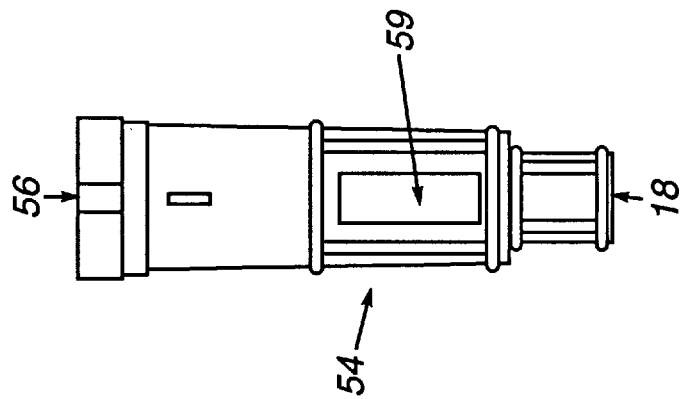
FIG. 19c shows a rear elevational view of the shaft member.
Figure 19B:
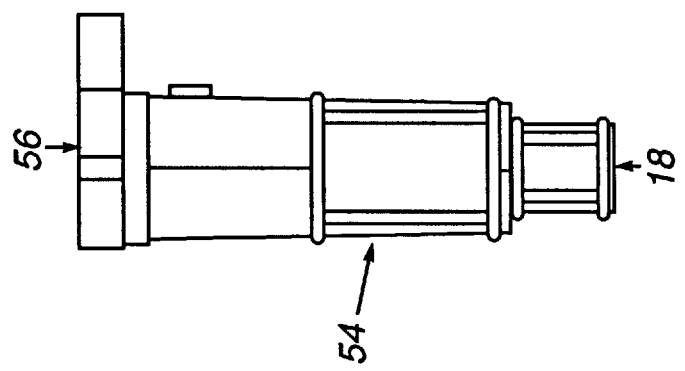
FIG. 19b shows a right elevational view of the valve member.
Figure 19A:
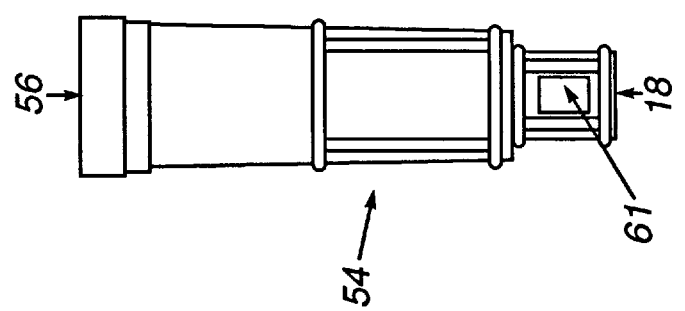
FIG. 19a shows a front elevational view of the shaft member.

Shaft member 54 is disposed within shaft 52. Shaft member 54 has a hollow interior defining two chambers, an upper chamber and a lower chamber. In the upper chamber is defined inlet opening 59 which corresponds to inlet opening 58 defined in faceplate 51 and shaft 52. The lower chamber defines outlet opening 61 which corresponds to outlet opening 60 defined in faceplate 51 and shaft 52. Inlet and outlet openings 59 and 60 respectively can best be seen in FIGS. 19a–c. The upper chamber allows communication between fill opening 56 and the interior of vessel 30 through inlet openings 58 and 59, and the lower chamber allows communication between vessel 30 and dispensing orifice 18 via outlet openings 60 and 61.

When shaft member 54 is disposed in shaft 52, it can be rotated therein to a fill position, a sealing position or a dispensing position. When in the fill position, inlet opening 59 in shaft member 54 is aligned with inlet opening 58 defined in faceplate 51 and shaft 52, thereby allowing communication between fill opening 56 and the interior of vessel 30 via the upper chamber of shaft member 54. In order to fill the interior of the vessel with pourable mixture, fill cap 16 seen in FIGS. 16 and 17(a),(b), and (c) is pivoted on rivet 17, seen in FIG. 16, to allow access to fill opening 56. Pourable mixture is poured through opening 56, through the upper chamber of shaft member 54 and through inlet openings 58 and 59, into the interior of vessel 30. In the preferred embodiment, inlet openings 58 and 59 are large enough such that the ambient air within vessel 30 can escape through fill opening 56 via inlet openings 58 and 59 as the mixture is poured in. When shaft member 54 is in the fill position, outlet opening 60 is sealed by the wall of shaft member 54.

When shaft member 54 is rotated to the sealed position, inlet opening 58 and outlet opening 60 are sealed by the wall of shaft member 54.

When in the dispense position, shaft member 54 is rotated such that outlet opening 61 of shaft member 54 is aligned with outlet opening 60 defined in faceplate 51 and shaft 52, to allow communication between the interior of vessel 30 and dispensing orifice 18 via the lower chamber of shaft member 54. When shaft member 54 is in the dispense position, inlet opening 58 is sealed by the wall of shaft member 54.

Figure 18A:
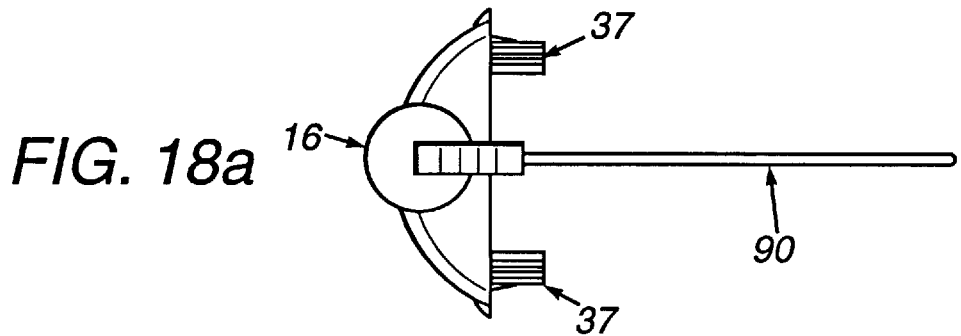
FIG. 18a shows a top plan view of the valve assembly.
Figure 18B:
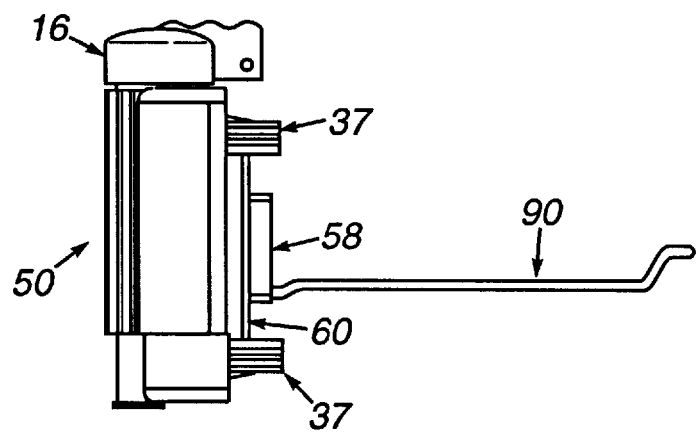
FIG. 18b shows a side elevational view of the valve assembly.
Figure 18C:
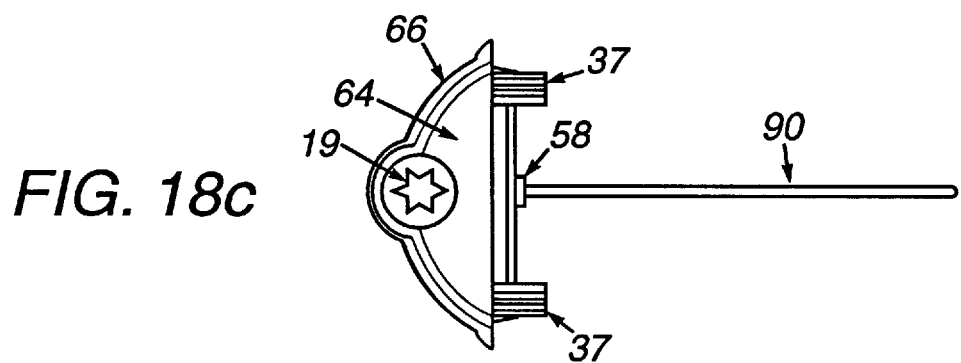
FIG. 18c shows a bottom plan view of the valve assembly.

The valve assembly housing is covered by decorative cover 66. Dispensing orifice 18 is covered by extrusion die 19, which defines the cross-sectional shape of the semi-frozen product as it is dispensed from vessel 30. Although shown in FIG. 18c as being star-shaped, extrusion die 19 could define any shape.

Outlet opening 60, defined in faceplate 51 and shaft 52, is partially surrounded by bevel 62 on the side which faces the interior of vessel 30, to aid helical blade 82 in guiding the semi-frozen product out of vessel 30. Bevel 62 is best shown in FIG. 17c.

Valve assembly 50 is fitted to vessel 30 prior to vessel 30 being inserted into housing 10. As the assembled vessel 30 and valve assembly 50 are inserted into housing 10, they are met with resistance by leaf springs 48, as shown in FIG. 3. When vessel 30 has been inserted far enough into housing 10, latch 15, shown in FIG. 3, engages one of a plurality of detents 46 defined in the outer wall 42 of vessel 30. The detents are best shown in FIG. 8. To release the vessel 30 from housing 10, release button 14 is pressed, thus removing latch 15 from detent 46. Leaf springs 48 then force vessel 30 out of housing 10. It is immaterial which one of the plurality of detents 46 is engaged by latch 15. The vessel 30 and attached valve assembly 50 should be rotated as they are inserted into housing 10 until valve assembly 50 is properly aligned with the outside of housing 10. Due to the position of ribs 36 and hooks 37, when valve assembly 50 is properly aligned with the exterior of housing 10, one of the detents 46 will be engaged by latch 15.

Figure 7:
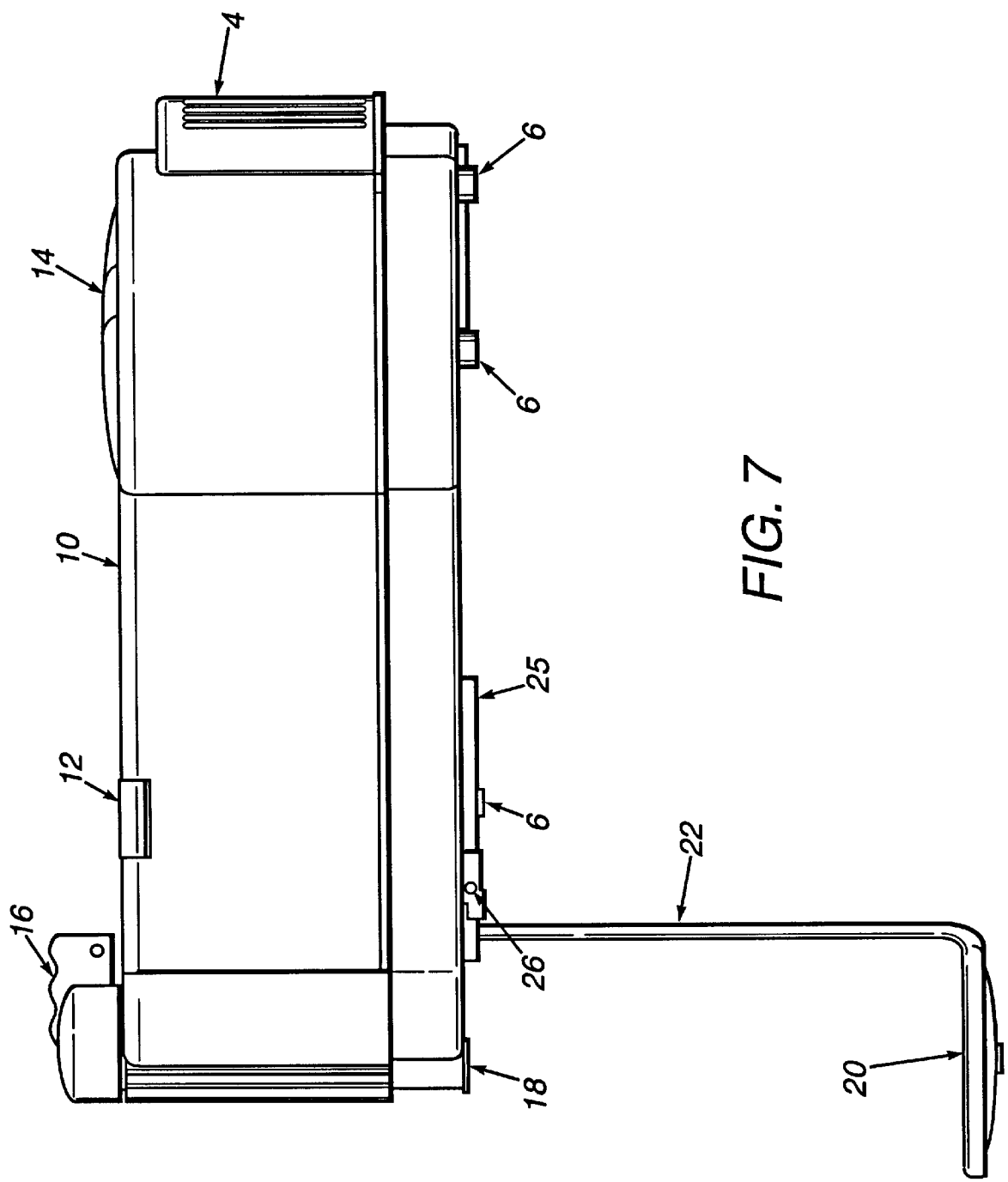
FIG. 7 shows a side elevational view of the alternate embodiment of the exterior of the device of FIG. 6.

In the embodiment of the device shown in FIG. 6, wherein drip pan 20 is suspended over the edge of a counter top by support member 22, drip tray 20 and support member 22 may be folded up and stored under housing 10. As best seen in FIG. 7, in this configuration, drip pan 20 and support member 22 are suspended from housing 10 by a pair of pins 25 which extend from the top of support member 22 and engage track 26 on the underside of housing 10. Drip pan 20 and drip pan support 22 can be rotated upwardly and slid under the housing 10 on the tracks for storage purposes. When in this position, drip pan support 22 will be underneath housing 10 and drip pan 20 will be adjacent to valve assembly 50. In the embodiment of FIG. 6, housing 10 is supported on a counter top by a plurality of feet 6, as shown in FIG. 7.

The device of this invention also contains an alarm that informs the user when the mixture has reached the proper frozen consistency. In one embodiment of this alarm, a timer is started when on/off switch 12 is pressed. After thirty minutes has elapsed an alarm is sounded via a piezo electric transducer (SP1 of FIG. 20). Thereafter, the alarm is sounded again at two minute intervals until a total time of forty-five minutes has elapsed since the pressing of on/off switch 12. Although the preferred embodiment uses the above specified timed intervals at which to sound the alarm, it is recognized that any convenient interval of time may be used.

In another embodiment of the alarm, samples of the current drawn by motor 99 are taken at predetermined intervals after the on/off switch 12 has been pressed. It has been noted that motor 99 draws its peak current at the same time that the semi-frozen mixture reaches its peak consistency for serving. Thereafter, the current drawn by motor 99 begins to decrease. The alternative embodiment of the alarm feature, therefore, senses when motor 99 has drawn its peak current by noting the rise of the amount of current drawn by motor 99 via the samples which are taken at timed intervals, and sounding an alarm when the amount of current drawn by motor 99 starts to decrease. After the initial alarm has sounded, the alarm will again be sounded at timed intervals thereafter, every 2 minutes in the preferred embodiment, until the motor is eventually shut off after a predetermined time, approximately 15 minutes after the first alarm has been sounded. In either embodiment, the motor can be restarted by pressing on/off switch 12.

Figure 20:
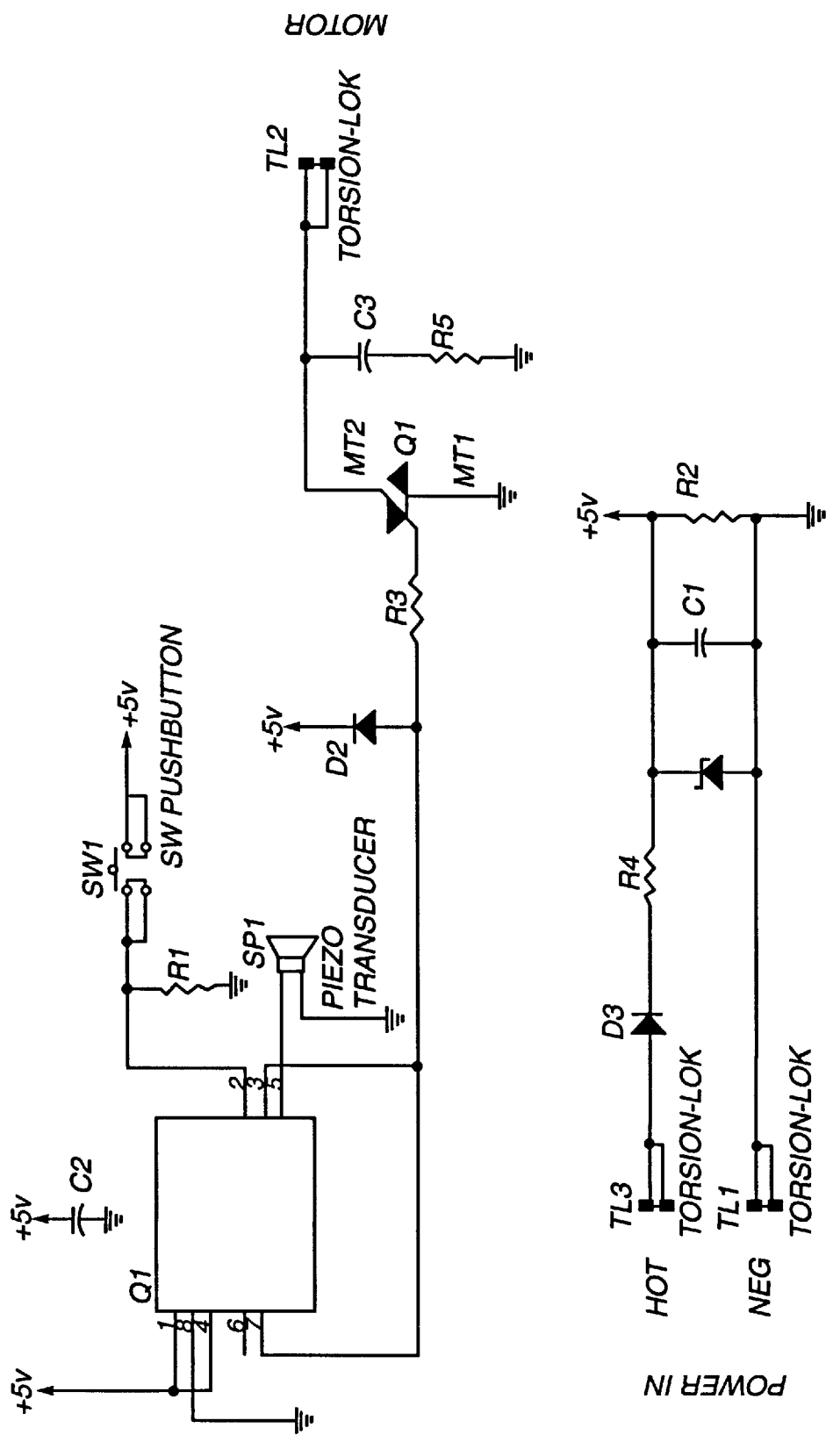
FIG. 20 shows one embodiment of the circuit of the device.

A sample circuit implementing the first embodiment of the alarm is shown in FIG. 20. The circuit uses an 8 pin microcontroller, such as Microchip Technologies part number PIC12C508, to implement the logic functions of the alarm. Power is toggled to the motor via triac Q1 when on/off switch SW1 is pressed. When switch SW1 is initially pressed, thirty minute and a forty-five minute timers are started. When the thirty minute timer has elapsed, a 4 Khz beep is sent to piezo electric transducer SP1. This beep is sent to SP1 at two minute intervals until the forty-five minute timer has elapsed, at which time power to the motor is toggled off. Power for the circuit is provided by a half-wave rectifier and zener regulator circuit powered from a 120 v AC power line.

I claim:

1. A dasher for a food processing device comprising:
   (a) an upper hub;
   (b) a lower hub;
   (c) a plurality of support members extending from said upper hub to said lower hub, said support members disposed around the perimeter of said upper and lower hubs at spaced intervals;
   (d) a stepped helix member disposed around said plurality of support members and extending from said lower hub to said upper hub, said helix member having flat steps where said helix member intersects said support members.

2. The device of claim 1 wherein said stepped helix has a first end adjacent to said lower hub and a second end adjacent to said upper hub, and first and second pitches, and wherein said helix has a first pitch starting at said first end and wherein said first pitch changes to said second pitch at a point between said first end and said second end.

3. The device of claim 2 wherein said point is more than one complete revolution from said second end of said stepped helix.

4. The device of claim 1, 2 or 3 wherein said dasher is plastic.

5. The device of claim 1, 2 or 3 wherein said dasher is injection molded as a single piece.

6. The device of claim 1, 2 or 3 wherein said dasher defines a recess in said lower hub.

* * * * *